July 28, 1942.　　　S. G. DOWN　　　2,290,948
BRAKE CONTROL SYSTEM
Filed Nov. 22, 1940
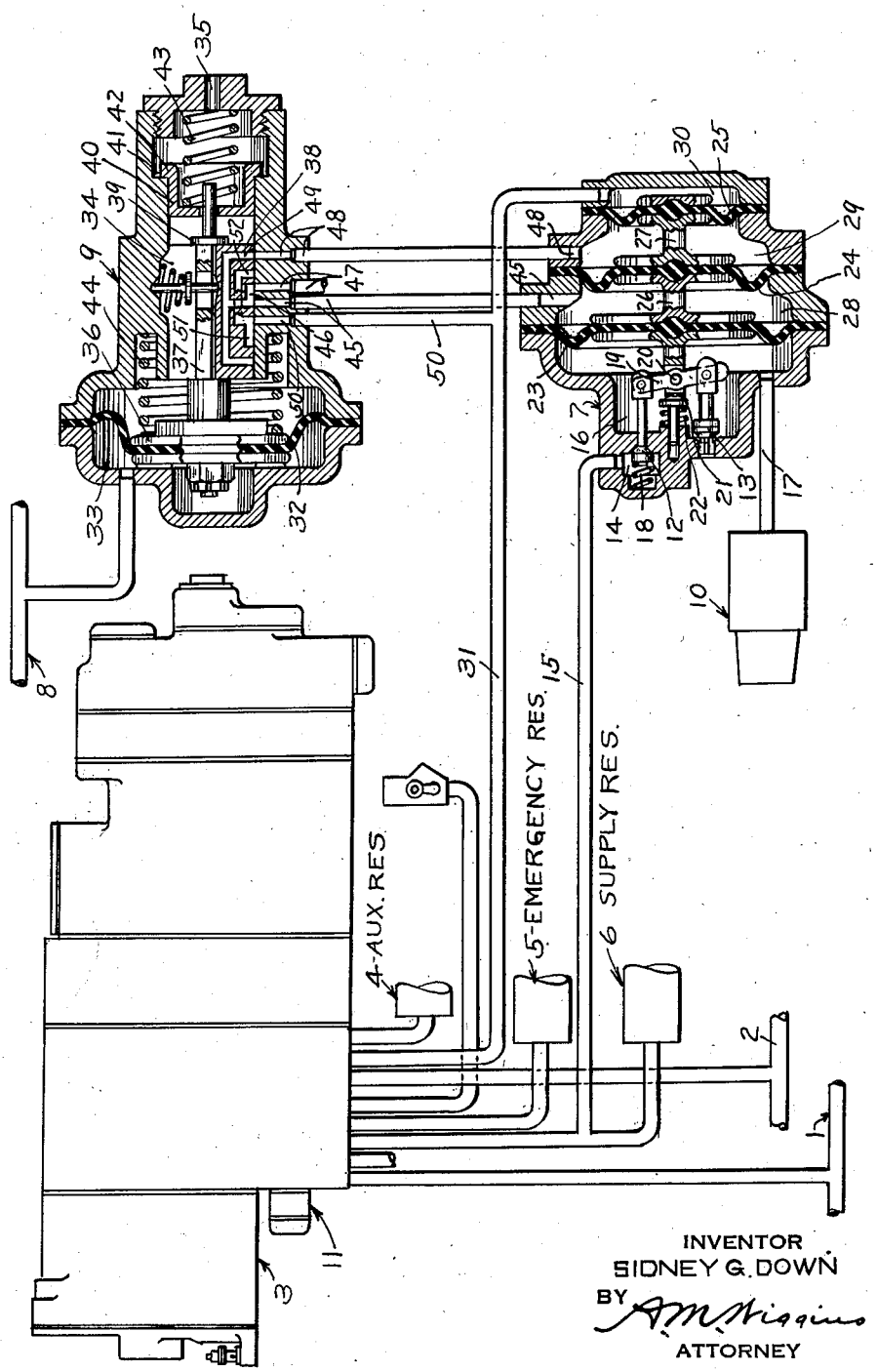
INVENTOR
SIDNEY G. DOWN
BY　*A. M. Higgins*
ATTORNEY Patented July 28, 1942

2,290,948

UNITED STATES PATENT OFFICE 2,290,948

BRAKE CONTROL SYSTEM

Sidney G. Down, Edgewood, Pa., assignor to The Westinghouse Air Brake Company, Wilmerding, Pa., a corporation of Pennsylvania Application November 22, 1940, Serial No. 366,633

5 Claims. (Cl. 303—23)

This invention relates to fluid-pressure brake equipment and more particularly to means automatically operative for selectively conditioning a single brake equipment for anyone of a plurality of different train services.

The railroad companies have provided several very important classes of train service, such for instance as passenger, express and freight, and have designated and equipped certain cars for the particular service in which they are to be employed.

It is well known that the fluid pressure brake requirements of the three enumerated classes of service differ from each other to such an extent, that while a fluid pressure brake equipment may be adequate for one class of service, it may be entirely inadequate for the other two classes of service. This will be understood when it is remembered that passenger trains are comparatively short and are operated on high speed schedules, that express trains are usually longer than passenger trains and are operated on speed schedules approaching passenger train schedules, and that freight trains are generally much longer than express trains and are operated on slower speed schedules. Due to this variation in the speed at which the trains are operated, there will necessarily be a difference in the brake cylinder pressure required for controlling the train in each service. For instance, in passenger service a very high brake cylinder pressure is used, in express train service a lower brake cylinder pressure is employed and in freight train service a still lower brake cylinder pressure is employed.

Modern transportation requirements are such that cars equipped for one class of service may also be employed in another class of service, so that under normal train operating conditions it is not uncommon for a train in any particular service to include cars equipped for any other class of service; for instance, it is not uncommon for each of passenger, express and freight trains to include passenger equipment cars, express cars and freight cars.

It has heretofore been the common practice to apply fluid pressure brake equipment designed for passenger service to the cars to be employed in express train service, but, for example, since passenger and express cars are sometimes included in long freight trains and the brake cylinder pressures employed on passenger and freight brake equipment differ so much from each other, such equipments cannot operate in harmony with each other when coupled together in the same train and therefore will not fully meet the present transportation requirements.

To meet the above mentioned braking requirements and to eliminate the above mentioned difficulties it is an object of the invention to provide means whereby a single type of vehicle brake controlling mechanism may be automatically changed over or conditioned to produce the desired brake cylinder pressure for different classes of train service.

Another object of the invention is to provide a vehicle fluid pressure brake equipment which is capable of producing a plurality of different brake cylinder pressures and which is adapted to be automatically and selectively conditioned to produce the proper brake cylinder pressure for any given class of train service in which the vehicle is to be employed.

Another object of the invention is to provide a vehicle fluid pressure brake equipment, capable of producing a plurality of maximum brake cylinder pressures with change-over means which, when a car having such equipment applied thereto is placed in a train for a certain class of service or is transferred from said train to a train in another class of service, will operate automatically to change-over or condition the equipment to produce the brake cylinder pressure suitable for the particular service in which the vehicle is to be employed.

Other objects and advantages will appear in the following more detailed description of the invention.

In the accompanying drawing the single figure is a diagrammatic view, partly in section, of a fluid pressure brake equipment embodying the invention.

As shown in the drawing, the fluid pressure brake equipment may be of the combined automatic and straight air type and may comprise a brake pipe 1, a straight air pipe 2, a brake controlling valve mechanism 3, an auxiliary reservoir 4, an emergency reservoir 5, a supply reservoir 6, a differential relay valve device 7, a signal pipe 8, a change-over valve device 9, and a brake cylinder 10.

The brake controlling valve mechanism 3 is what is known as the "D-22" type and may be of substantially the same construction as the corresponding control valve mechanism shown and described in detail in Patent No. 2,152,257, of Ellis E. Hewitt and Donald L. McNeal, issued March 28, 1939, and is employed for the purpose of controlling the application and release of the brakes. This mechanism is operative upon a service reduction in brake pipe pressure to supply fluid under pressure from the auxiliary reservoir 4 to the differential relay valve device 7 and is operative in response to an emergency reduction in brake pipe pressure to supply fluid under pressure from both the auxiliary and emergency reservoirs to the relay valve device 7. In response to an increase in brake pipe pressure the mechanism operates to vent fluid under pressure from the relay valve device. The operation of the relay valve device in response to the pressure of fluid supplied thereto and the venting of fluid therefrom will hereinafter be more fully described.

Associated with the brake controlling valve mechanism 3, and preferably carried by the casing thereof, is a double check valve device 11 which, as fully described in the aforementioned patent, is adapted, in one position, to establish the supply and venting communication between the brake controlling valve mechanism 3 and an application and release pipe 31 leading toward the relay valve device 7, and which, in another position, is adapted to establish the supply and venting communication between the straight air pipe 2 and this application and release pipe.

The differential relay valve device 7 is provided for the purpose of controlling the supply of fluid under pressure to and the release of fluid under pressure from the brake cylinder 10, the supply in the present embodiment of the invention being from the normally charged supply reservoir 6 and the release being to the atmosphere. This device comprises a casing in which there is operatively mounted a fluid pressure supply and release valve mechanism and a differential diaphragm assemblage which is operative to effect the operation of the valve mechanism.

The supply and release valve mechanism comprises a supply valve 12 and a release valve 13. The supply valve is contained in a chamber 14 provided in the casing, which chamber is, in the present embodiment of the invention, in constant open communication, by way of a pipe 15, with the supply reservoir 6 and is operative to control communication between the chamber 14 and a chamber 16 which is in constant open communication, by way of a pipe 17, with the brake cylinder 10. This supply valve is normally maintained in its communication closing position by means of a spring 18 which is contained in chamber 14. The release valve 13 is contained in chamber 16 and is operative to control the opening and closing of a release passage provided in the casing and leading from the chamber 16 to the atmosphere.

The supply valve is provided with the stem which is operatively connected to one end of a control lever 19 contained in chamber 16, and the release valve is provided with a stem which is operatively connected to the other end of the lever. This valve controlling lever is pivotally mounted, intermediate its ends on a pin 20 which is carried by a stem 21 operatively associated with the diaphragm assemblage, which stem is movable longitudinally, as will hereinafter be described, to actuate the lever 19 and thereby the supply and release valves to control the supply of fluid under pressure to and the release of fluid under pressure from the brake cylinder. The stem 21 is normally maintained in the position in which it is shown in the drawing by the action of the spring 22 interposed between and operatively engaging a wall of the casing and a collar carried by the stem. With the stem in the position in which it is shown the supply valve will be seated and the release valve unseated.

The diaphragm assemblage comprises a series of movable abutments or flexible diaphragms 23, 24 and 25 having increasing pressure areas in the order in which they are referred to. These diaphragms are coaxially arranged with relation to each other and to the longitudinally removable stem 21 and are clamped to the casing in spaced relationship with each other. These diaphragms are operatively associated with each other and are maintained spaced apart by means of spacers or follower members 26 and 27, the follower member 26 being disposed between the diaphragms 23 and 24 and the follower member 27 being disposed between the diaphragms 24 and 25. The diaphragm 23 is in operative engagement with the inner end of the stem 21 as shown, so that the diaphragm assemblage and follower members are operative to control the operation of the stem.

One surface of the diaphragm 23 and an inner surface of the casing defines the chamber 16 in which the supply and release valve mechanism is located; the adjacent faces of the diaphragms 23 and 24 and an inner surface of the casing defines a chamber 28; the adjacent faces of the diaphragms 24 and 25 and an inner surface of the casing defines a chamber 29; and the other surface of the diaphragm 25 and an inner surface of the casing defines a chamber 30.

The chamber 30 is in constant open communication with a fluid pressure supply and release pipe 31 through which, in the present embodiment of the invention fluid is supplied and released by way of the brake controlling valve mechanism 3 or straight air pipe 2.

The change-over valve device 9 is provided for the purpose of selectively cutting the chambers 28 and 29 into communication with the supply and release pipe 31 and is operative according to signal pipe pressure to its several selecting positions. This device may comprise a casing in which there is clamped a movable abutment or flexible diaphragm 32 having at one side a chamber 33 which is in constant open communication with the signal pipe 8, and having at the other side a valve chamber 34 which is in constant open communication through a passage 35 with the atmosphere. Securely clamped to this diaphragm is a follower 36 having a stem 37 adapted to operate a selector slide valve 38 contained in the chamber 34. The stem 37 adjacent its rear end is provided with a collar 39 which when the slide valve is in its passenger train service position, as will hereinafter be described, is adapted to engage a yieldable stop 40 slidably mounted in the casing in axial alignment with the stem. The stop 40 is adapted to be positioned as shown by an annular stop shoulder 41 formed on the casing with which an annular stop lug 42 on one end of the stop is adapted to engage, and is subject to the pressure of a spring 43 which, at all times, tends to move the stop in the direction toward the stop shoulder. Rearwardly of the collar 39 the stem 37 is slidably guided in an opening provided in the stop 40.

Contained in the chamber 34 of the changeover valve device 9 and interposed between and operatively engaging the follower 36 and the casing is a spring 44 which, at all times, exerts pressure on the follower in a direction toward the left hand.

OPERATION

Freight train service

Assuming first that a vehicle equipped with the invention is to be employed in freight train service, the several parts of the change-over valve device 9 will be in the position in which they are shown. Since, in freight train service, there is no need for a signal pipe, the signal pipe 8 and thereby the chamber 33 of the change-over valve device 9 are at atmospheric pressure, so that the spring 43 acts to maintain the parts in this position.

With the selector slide valve 38 in the position in which it is shown, the chamber 28 of the differential relay valve device 7 is connected to the atmosphere by way of passages and pipe 45, a cavity 46 in the slide valve 38 and a passage and pipe 47. The chamber 29 is also connected to the atmosphere by way of passages and pipe 48, a passage 49 in the slide valve and cavity 46 and passage and pipe 47.

When the brake pipe pressure is reduced to effect an application of the brakes the brake controlling valve device 3 functions to supply fluid under pressure past the double check valve device 11 to the pipe 31 and thereby to the diaphragm chamber 30. Fluid under pressure supplied to this chamber causes the diaphragm assemblage to actuate the stem 21 and valve mechanism to seat the exhaust valve 13 and unseat the supply valve 14. With the supply and exhaust valves thus positioned fluid under pressure flows from the supply reservoir to the chamber 16 and from thence to the brake cylinder 10. When the pressure of fluid in chamber 16 and acting on diaphragm 23 becomes high enough to overcome the pressure of fluid in chamber 30 the diaphragm assemblage will be shifted in a direction toward the right hand permitting the spring 22 to move the stem 21 and pivot pin for valve controlling lever toward the right hand. As the pin is thus moved the spring 18 will seat the supply valve and cut off the further flow of fluid under pressure to the chamber 16, so as to insure the diaphragm assemblage coming to a stop before the release valve is unseated.

Now when the brake pipe pressure is increased to effect a release of the brakes the brake controlling valve device 3 will function to establish a communication from the pipe 31 to the atmosphere so that fluid under pressure will be vented from the chamber 30. With the chamber 30 thus vented the fluid at brake cylinder pressure present in chamber 16 and acting upon the diaphragm 23 will cause the diaphragm assemblage to move further in a direction toward the right. Upon such movement the spring 22 acts to move the stem 21 a sufficient distance as to cause the lever 20 to unseat the exhaust valve 13 and thereby permit fluid under pressure to flow from the brake cylinder to the atmosphere, thus releasing the brakes.

Passenger train service

In passenger train service the signal pipe 8 is normally charged with fluid under a pressure of approximately forty-five pounds. Assuming that the vehicle is to be employed in passenger train service the fluid at signal pipe pressure in chamber 33 of the change-over valve device 9 will cause the flexible diaphragm 32 to be flexed in a direction toward the right hand against the opposing pressure of the spring 44 until such time as the flexing is brought to a stop by the engagement of the collar 39, on the follower stem, with the stop 40, the spring 42 being of such a value that it will not yield to the force exerted by the diaphragm 32. With the selector slide valve 38 in this position a branch pipe and passage 50, leading from the pipe 31, is connected by way of a cavity 51 in the slide valve to the passage 45 leading to the diaphragm chamber 28. The cavity 51 in the slide valve is provided with a tail port 52 which in this position of the valve connects the cavity 51 to the passage 48 leading to the diaphragm chamber 29, so that chamber 29 is also connected to the branch pipe 50 and thereby to the pipe 31.

When the brake pipe pressure is reduced to effect an application of the brakes the brake controlling valve mechanism 3 functions to supply fluid under pressure through the check valve device 11 to the pipe 31 and thereby to the diaphragm chambers 28, 29 and 30. The flow of fluid to the chamber 30 being directly from the pipe 31 and the flow of fluid to the chamber 28 being by way of pipe and passage 50, cavity 51 in the selector slide valve 38 and pipe and passages 45, and the flow of fluid to the chamber 29 being by way of cavity 51, tail port 52 and passages and pipe 48. The pressure of fluid supplied to the chambers 28, 29 and 30 being equal, the diaphragms 24 and 25 will be balanced, however, the pressure of fluid in chamber 28 acts upon the large diaphragm 23 to cause the diaphragm assemblage to move in a direction toward the left hand to actuate the stem 21 to effect the operation of the supply and release valve mechanism to seat the release valve 13 and unseat the supply valve 14. With the supply valve unseated fluid under pressure from the supply reservoir 6 flows to the chamber 16 and from thence to the brake cylinder 10 to effect an application of the brakes. When the pressure of fluid in chamber 16 and acting on one side of the diaphragm 23 is sufficient to overcome the pressure of fluid in chamber 28 acting on the other side of the diaphragm, the diaphragm will flex toward the right hand and permit the spring 22 to actuate the stem 21 in the same direction. As the stem 21 is thus moved the spring 18 acts to seat the supply valve to close off the further flow of fluid from the supply reservoir to the chamber 16. With this fluid pressure supply closed off the diaphragm assemblage will come to a stop before the release valve is unseated and therefore the brakes will be maintained applied.

When the brake pipe pressure is increased to effect the release of the brakes the brake controlling mechanism functions to vent the pipe 31 and thereby the chambers 28, 29 and 30 to the atmosphere. With these chambers vented fluid under pressure in chamber 16 causes the diaphragm 25 to flex further toward the right hand thus permitting the spring 22 to move the stem 21 far enough to effect the unseating of the release valve 13. With the release valve unseated fluid under pressure is vented from the chamber 16 and thereby from the brake cylinders 10, thus effecting the release of the brakes.

If, instead of using the brake pipe for controlling the application and release of the brakes, the straight air pipe is used for this purpose, the check valve device 11 will function to establish a communication from the straight air pipe to the pipe 31, and with this communication established the supply and release of fluid under pressure to and from the pipe 31 will effect the same operations of the differential relay valve device as effected upon the operation of the brake controlling valve device 3.

*Express train service*

In express train service, the signal pipe, instead of being charged with fluid at a pressure of forty-five pounds, will be charged to a pressure of around one hundred and ten pounds, so that when the vehicle is employed in such a train the signal pipe pressure in chamber 33 of the change-over valve device 9 will be sufficient to flex the diaphragm 32 to its extreme right hand position thus moving the stem 37 and selector slide valve 38 to its extreme right hand position against opposing pressure of the yieldable stop 40 acting on the collar 39 of the stem. The several parts of the device will now remain in their extreme right hand position as long as the signal pipe 8 is charged to the pressure normally carried therein.

With the slide valve 38 in this position the chamber 28 of the differential relay valve device is connected to the atmosphere by way of passages and pipe 45, cavity 51 in the selector slide valve 38 and passage and pipe 47, and the branch pipe and passage 50 leading from the pipe 31 is connected through port 49 in the slide valve and cavity 46 to the passages and pipe 48 leading to the diaphragm chamber 29 of the relay valve device.

When fluid under pressure is supplied to the pipe 31 either under automatic or straight air control, such fluid under pressure flows from this pipe directly to the chamber 30 and to the chamber 29 by way of branch pipe and passage 50, port 49 in the selector slide valve 38, cavity 46 and passage and pipe 48. The pressure of fluid supplied to chambers 29 and 30 will be equal so that the diaphragm 25 will be balanced, however fluid under pressure in chamber 29 and acting on the diaphragm 24 will cause the diaphragm 24 to flex in the direction toward the left hand and actuate the stem 21 and thereby the supply and release valve mechanism to supply fluid under pressure from the supply reservoir 6 to the brake cylinder 10 in the same manner as hereinbefore described in connection with freight and passenger train service.

When the pressure of fluid in chamber 16 is sufficient to overcome the opposing pressures of fluid in chamber 29 and acting on diaphragm 25, the diaphragm assembly will be moved toward the right to permit the spring 22 to actuate the valve mechanism to seat the supply valve without unseating the exhaust valve.

When in initiating the release of the brakes the pipe 31 is connected to the atmosphere either by way of the brake controlling valve device 3 or the straight air pipe 2, fluid under pressure will be vented from chambers 29 and 30 by way of this pipe 31. With these chambers vented fluid under pressure in chamber 16 will cause the diaphragm assembly to move further toward the right and cause the exhaust valve to be unseated thus venting fluid under pressure from the brake cylinder to the atmosphere to effect the release of the brakes.

It will be understood from the foregoing description that in freight train service for chosen pressure of fluid supplied through the pipe 31 a lighter brake application will be obtained than for either passenger or express train service and that in passenger train service a heavier brake application will be obtained than for either freight or express train service and further that for express train service a brake application will be obtained which will be heavier than that for freight train service and lighter than that for passenger train service. All of this is due to the action of the differential diaphragms 23, 24 and 25 and to their selection by the change-over valve device in accordance with signal pipe pressure.

It should here be mentioned that while the invention has been described in connection with a combined automatic and straight air brake equipment it may be employed in either an automatic brake equipment or a straight air brake equipment.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, in combination; a relay application and release valve mechanism adapted to be conditioned to function to provide a different degree of braking for each of a plurality of classes of train service, said mechanism comprising valve means operative to control the braking and also comprising a movable abutment responsive to fluid under pressure for controlling said valve means to provide the degree of braking appropriate for one class of train service, a second movable abutment responsive to fluid under pressure for controlling said valve means to provide the degree of braking appropriate for a second class of train service, and a third movable abutment responsive to fluid under pressure for controlling said valve means to provide the degree of braking for a third class of train service; a pipe charged with fluid at a different pressure in each of two classes of train service and uncharged in a third class of train service; and means operative according to the pressure of fluid in said pipe or the absence of pressure therein for rendering the appropriate abutment responsive to fluid under pressure to control said valve means.

2. In a fluid pressure brake equipment, in combination; a relay application and release valve mechanism adapted to be conditioned to function to provide a different degree of braking for each of a plurality of classes of train service, said mechanism comprising valve means operative to control the braking and also comprising a movable abutment responsive to fluid under pressure for controlling said valve means to provide the degree of braking appropriate for one class of train service, a second movable abutment responsive to fluid under pressure for controlling said valve means to provide the degree of braking appropriate for a second class of train service, and a third movable abutment responsive to fluid under pressure for controlling said valve means to provide the degree of braking appropriate for a third class of train service; a signal pipe charged with fluid under pressure in each of two of said classes of train service and uncharged in a third class of train service; a change-over valve having a position for each of said classes of train service for rendering the appropriate diaphragm responsive to fluid under pressure to control said valve means; and means responsive to signal pipe pressure for actuating said change-over valve.

3. In a fluid pressure brake system, the combination of a communication through which fluid under pressure is supplied to effect an application of the brakes and through which fluid under pressure is released to effect the release of the brakes, a brake cylinder, a relay brake application and release valve mechanism comprising valve means operative to supply fluid under pressure to and to release fluid under pressure from the brake cylinder, and also comprising a plurality of movable fluid pressure responsive abutments for controlling the operation of said valve means, said abutments each having a different area and each being adapted to be rendered active by a given fluid pressure in said communication to cause said valve means to operate to produce a different brake cylinder pressure, a signal pipe carrying fluid at a different pressure for each of a plurality of classes of train service, and means operative according to the signal pipe pressure for so connecting said communication to the relay valve device as to select the appropriate movable abutment for operation to produce the proper brake cylinder pressure for the class of train service called for by the signal pipe pressure.

4. In a fluid pressure brake system the combination of a communication through which fluid under pressure is supplied to effect an application of the brakes and through which fluid under pressure is released to effect the release of the brakes, a brake cylinder, a relay brake application and release valve mechanism comprising valve means operative to supply fluid under pressure to and to release fluid under pressure from the brake cylinder, and also comprising a plurality of movable fluid pressure responsive abutments for controlling the operation of said valve means, said abutments each having a different area and each being adapted to be rendered active by a given fluid pressure in said communication to cause said valve means to operate to produce a different brake cylinder pressure, a signal pipe carrying fluid at a different pressure for each of a plurality of classes of train service, and means operative according to signal pipe pressure for so connecting said communication to the relay valve device as to select the appropriate movable abutment for operation to produce the proper brake cylinder pressure for the class of train service called for by the signal pipe pressure, one of said abutments being subjected to the pressure of fluid supplied to the brake cylinder and being operative in opposition to the abutment selected by said means to effect the operation of said valve means to cut off the supply of fluid under pressure to the brake cylinder, and being operative upon a reduction in the pressure of fluid acting on the chosen abutment to effect the operation in said valve means to vent fluid under pressure from the brake cylinder.

5. In a fluid pressure brake system the combination of a communication through which fluid under pressure is supplied to effect an application of the brakes and through which fluid under pressure is released to effect the release of the brakes, a brake cylinder, a relay brake application and release valve mechanism comprising valve means operative to supply fluid under pressure to and to release fluid under pressure from the brake cylinder, and also comprising three movable fluid pressure responsive abutments for controlling the operation of said valve means, said abutments having different areas and each being adapted to be rendered active by a given fluid pressure in said communication to cause said valve means to operate to produce a different brake cylinder pressure, the first abutment having the largest area and being operative to effect the supply of fluid under pressure to the brake cylinder in passenger train service, the second abutment having a larger area than that of the first abutment and being operative to effect the supply of fluid under pressure to the brake cylinder in express train service, and the third abutment having a lesser area than that of the second abutment and being operative to effect the supply of fluid under pressure to the brake cylinder in freight train service, a signal pipe carrying fluid at a different pressure in each of said classes of train service, and means operative according to the signal pipe pressure for so connecting said communication to the relay valve device as to select for operation the movable abutment which is appropriate for use in the particular class of train service called for by the signal pipe pressure, the said first abutment being subjected to the pressure of fluid supplied to the brake cylinder in response to the operation of any one of the movable abutments and being operative when, under the influence of brake cylinder pressure, the power exerted by the abutment is equal to the power exerted by the chosen abutment to effect the operation of the valve means to cut off the flow of fluid from the brake cylinder, and operative upon a reduction in the pressure of fluid in said communication for effecting the operation of said valve means to vent fluid under pressure from the brake cylinder.

SIDNEY G. DOWN.